Aug. 22, 1939.   R. SICA   2,170,619
DISPENSING VALVE
Filed March 21, 1939
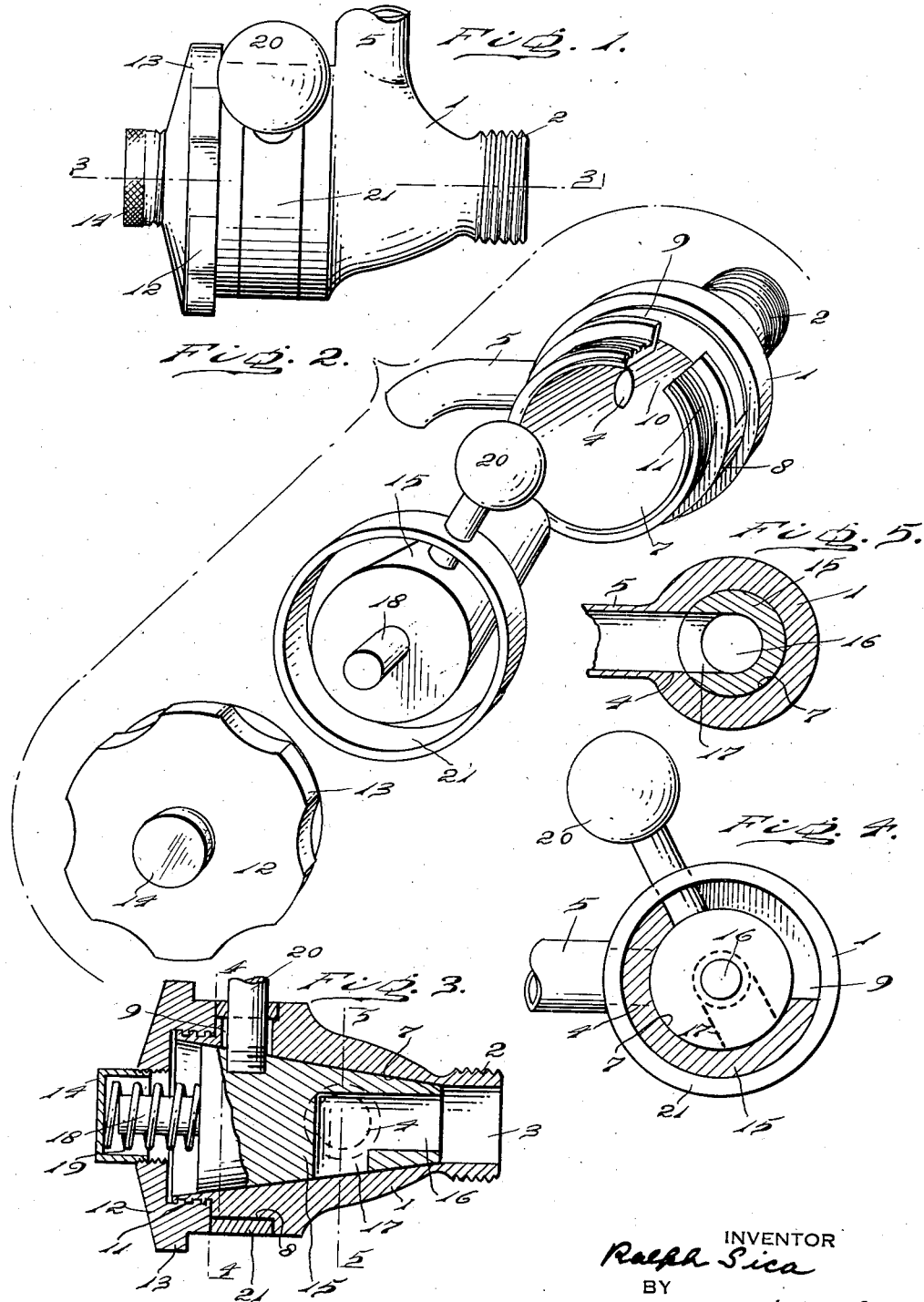
INVENTOR
Ralph Sica
BY
Herbert S. Fairbanks
ATTORNEY Patented Aug. 22, 1939

2,170,619

UNITED STATES PATENT OFFICE 2,170,619

DISPENSING VALVE

Ralph Sica, Philadelphia, Pa.

Application March 21, 1939, Serial No. 263,107

3 Claims. (Cl. 251—91)

The object of this invention is to devise a novel construction of a dispensing valve having a novel construction of valve casing, valve and valve operating means which can be readily taken apart so that the passage through which the liquid passes can be thoroughly cleaned.

It has been found that if a dispensing valve is used for dispensing coffee for example, the coffee is deposited on the walls of the passages and if it is not removed before a new supply of coffee is dispensed, there is a deleterious action on the new supply of coffee as it is being dispensed.

With the above and other objects in view, as will hereinafter clearly appear, my invention comprehends a novel dispensing valve.

It further comprehends a novel valve having a valve casing with a laterally disposed segmental slot which opens through the rear end of the valve casing, and is adapted to receive a handle connected to the valve plug and provided with an annular band which rides on the valve body.

Other novel features of construction and advantage will hereinafter clearly appear in the detailed description and the appended claims.

For the purpose of illustrating the invention, I have shown in the accompanying drawing a typical embodiment of which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a top plan view of a dispensing valve embodying my invention.

Figure 2 is an exploded view.

Figure 3 is a section on line 3—3 of Figure 1.

Figure 4 is a section on line 4—4 of Figure 3.

Figure 5 is a section on line 5—5 of Figure 3.

Similar numerals indicate corresponding parts.

Referring to the drawing:

1 designates a valve casing having its inner end threaded as at 2 to adapt it to be connected with a source of liquid supply. The valve casing has an inlet 3 and an outlet 4 which leads to a delivery tube 5. The valve casing has a tapered seat 7. The rear portion of the valve casing is of reduced diameter at 8 and is provided with a segmental slot 9 which communicates with a longitudinally extending slot 10 which opens through the outer end of the valve casing. The outer end portion of the valve casing is threaded at 11 to receive a threaded closure 12, having a flange 13 with recesses in its periphery to facilitate the turning of the closure. The cap has a tubular central extension closed at its outer end by a cap 14 in threaded engagement with such extension.

The valve plug 15 is tapered to seat in the valve casing and has an inlet passage 16, opening through its forward end and communicating with an outlet passage 17 opening through its side wall. The outer end of the valve has a rod 18 to receive a spring 19, one end of which abuts against the valve plug and the other end of which is in the tubular extension of the closure and abuts against the cap 14.

A handle 20 is fixed at its inner end to the valve plug 15 and carries an annular band 21 which is mounted to turn on the reduced diameter 8 of the valve casing when the parts of the valve are assembled.

In the operation, the segmental slot 9 limits the movement of the handle. When the handle 20 is at the left hand end of the slot the valve is closed, and when at the right hand end of the slot the valve is open. This provides for a very rapid operation of the valve since the operator does not have to grasp the handle but simply moves his hand against it to move it in a selected position.

When it is desired to clean the valve, the closure 12 is removed, the handle turned into registry with the longitudinal slot 10, and the handle 20 with the annular band or ring 21 and the valve plug are removed as a unit of structure from the valve casing. A wire or other brush can be passed through the inlet and through the outlet of the valve casing and through the passages in the valve plug to effectively clean them, and remove any sediment or deposits on the walls of the passages.

The cap, valve plug and their adjuncts can be scrubbed with a cleaning solution.

The tension of the spring 19 may be varied by adjustment of the cap 14.

The annular band or ring 21 which is rotatable on the casing, contributes to center the valve in the valve casing and facilitates the turning of the valve, without binding action on its seat in the valve casing.

My present invention provides a valve which can be quickly taken apart and assembled, and which can be maintained in a clean and sanitary condition.

Having thus described my invention, what I claim as new and desire to secure by Letters Patent is:

1. In a dispensing valve, a valve casing having a tapered seat, an inlet, an outlet, a circumferentially extending segmental slot with a longitudinal slot leading therefrom through the juxtaposed end of the valve, a valve plug having an inlet and an outlet, a handle extending through said segmental slot and fixed to the valve plug, a ring fixed to the handle and rotatable on the valve casing, a closure for the valve casing retaining the ring in position, and a spring between the valve plug and the closure.

2. In a dispensing valve, a valve casing having a tapered seat, an inlet at one end and an outlet through the side wall of said seat, the other end of said casing having a portion of reduced diameter which merges into a threaded portion, said portion of reduced diameter having a circumferential, segmental slot, and a radial slot opening from said segmental slot through the juxtaposed end of the valve casing, a valve plug to engage said seat having a passage opening through one end and its side wall to register with the inlet and outlet of the valve casing on the turning of the valve, a handle fixed to said valve and extending through the segmental slot, a ring fixed to the handle and having a bearing on said portion of reduced diameter, a detachable closure for the valve casing and a spring between said valve plug and closure.

3. In a dispensing valve, a valve casing having a tapered seat, an inlet at one end and an outlet through the side wall of said sheet, the other end of said casing having a portion of reduced diameter which merges into a threaded portion, said portion of reduced diameter having a circumferential, segmental slot, and a radial slot opening from said segmental slot through the juxtaposed end of the valve casing, a valve plug to engage said seat having a passage opening through one end and its side wall to register with the inlet and outlet of the valve casing on the turning of the valve, a handle fixed to said valve and extending through the segmental slot, a ring fixed to the handle and having a bearing on said portion of reduced diameter, and retained in position by said closure, a detachable closure for the valve casing and a spring between said valve plug and closure.

RALPH SICA.